8114X
Z. Allen,
Steam Cut-Off.
Patented Mar. 28, 1834.
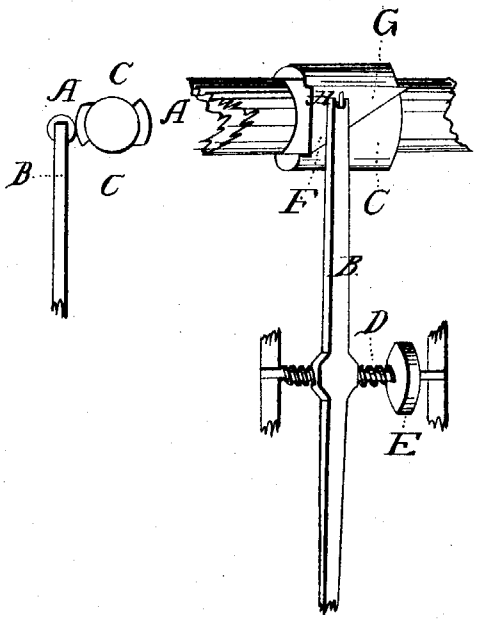
AM. PHOTO-LITHO. CO. N.Y. (OSBORNE'S PROCESS)

8114X Mar 28. 1834 595

Zachariah Allen of Providence Rhode Island

Letters Patent

The Schedule refered to in these Letters Patent and making part of the same containing a description in the words of the said Zachariah Allen himself of his improvement in the mode of operating Steam Engines To all to whom these presents shall come. Be it known that Zachariah Allen of Providence in the State of Rhode Island a Citizen of the United States has made a new and useful improvement in the mode of constructing and operating Steam Engines which improvement consists in so arranging the apparatus of the steam valves. as to cause the steam to pass freely from the boiler to act upon the piston with its full pressure during a longer or shorter period or portion of each respective stroke. to the extent which may be necessary to maintain the required equable movement of the Steam Engine. instead of wasting ineffectually the force of the steam. by choking its passage through the throttle valve. which as its name figuratively implies, throttles the steam in the pipe in its progress from the boiler to the Engine in order to destroy a portion of its too active force.

By the usual mode of connecting the apparatus called the Mill governor. a regulator with the throttle valve. whenever a fresh supply of fuel is added to the furnace, or a part of the load of machinery. operated by the steam Engine is disengaged, in order that the increased elastic force of the steam. may not impart a hurried impetus to the movements. of the Engine, a portion of the steam is unprofitably wasted by being "wire drawn" as it has been termed through the contracted passage of the throttle valve.

Altho. by the weight of the safety valve a pressure of 60 lbs to the inch may be indicated to exist in the boiler, yet if the engine be operated with a diminished load of machinery. the actual useful pressure on the piston may be reduced by the throttle valve to 20 or 30 lbs. to the inch. A large portion of the elastic force of the steam may be thus destroyed by the throttle valve. when nearlyclosed by the regulator, in order to reduce the action of the steam to
a level with the diminished resistence to be overcome to preserve the
equable motion of the mechanism. In this manner is fruitlessly expen-
ded, the cost of generating in the boiler steam of higher pressure
than may actually be used upon the piston.

By the proposed improvement. the Regulator would in this case
admit the full undiminished pressure of the steam from the
boiler to act upon the piston during an adequately regulated por-
tion of each respective stroke, to accommodate the degree of action
to the resistence to be overcome, to preserve the desired equable move-
ment of the Engine. The Steam after thus occupying a part of the
cylinder. with its full elastic pressure upon the piston will con-
tinue to act upon it expansively, during the remainder of its stroke,
and in this way will exhaust all its moving force.

When the Regulator is not used as is commonly the case on board.
of Steam Boats by adjusting the lever, by hand upon the cam
A. in the annexed draft the steam may be cut off at the dis-
cretion of the Engineer. When the air pump is attached to
the Steam Engine to obtain the advantage of the atmospheric pres-
sure. the proposed improvement will ensure a much more effect-
ive and economical use of the elastic and expansive power of steam.

The aforesaid improvement may be carried into effect simply
by fixing upon the shaft of the crank a fly wheel or upon any
other Shaft performing one revolution for each stroke of the en-
gine, a cam of a wedge form, as at A. whilst the end of the lever
B is lifted by the ridge of this revolving cam. the opposite end of
it operates by means of a connecting Rod. upon a valve of the same
form as the common throttle valve, which it opens wide for the steam
to pass from the boiler with its full force against the piston. and
when the end of the lever B drops into the hollow between the ridges
of the cams at C the [illegible] of the opposite end of the lever closes
the valve instantaneously in the usual way.

To accomplish the plan of prolonging or diminishing the period of the

8114x Mar. 28, 1834 [illegible]

admission of the steam upon the piston. The lever B is caused to traverse back and forth on the screw D. or upon a smooth pivot D. which serves as a fulcrum upon which the lever vibrates The regulator is caused to act upon a pulley. or cog wheel at E which turns the screw .. D in the proper direction to move the lever B. towards the wide end of the cam at F. whenever the steam Engine requires more steam, to accelerate its motion, and toward the narrow point of the cam at G. whenever the reverse of this effect is required. When the lever B traverses over the broad part of the cam at F. it remains elevated upon it during a longer portion of each revolution. and consequently keeps open during a longer portion of each stroke, the valve for admitting the steam to act with greater power upon the piston, When on the other hand the movement of the Engine becomes too much accelerated, the end of the lever B is moved by the regulator over the narrow part of the cam at G, upon which it rises to let the steam flash upon the piston for an instant and then by falling from it immediately it closes the valve. The lever B thus vibrates by means of the regulator, or otherwise over the cam A from F to G. produces the effect of both rendering the movements of the Steam Engine equable, and causes an important saving in the application of the elastic power of steam, and consequently of the fuel required to generate it. In testimony that the above is a true Specification of my said improvement as above described, I have hereunto set my hand this twenty first day of December AD 1833. Exd. W.G.C.

Witnesses
Amher. ? Everett
Thomas White

Zachariah Allen

Drawing (1170 Words)